O. ANDERSON.
MILKING MACHINE.
APPLICATION FILED JUNE 21, 1911.
1,118,257.
Patented Nov. 24, 1914.
2 SHEETS—SHEET 1.
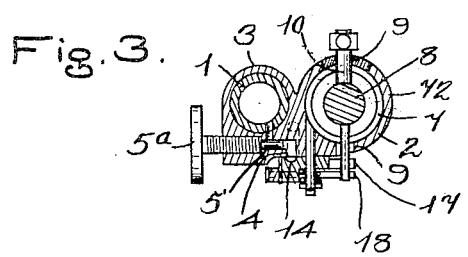
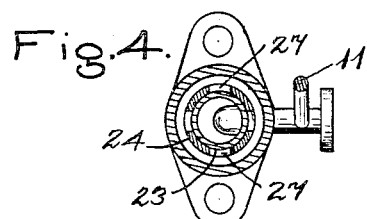
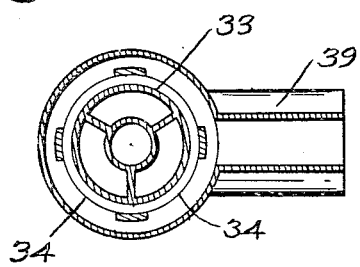
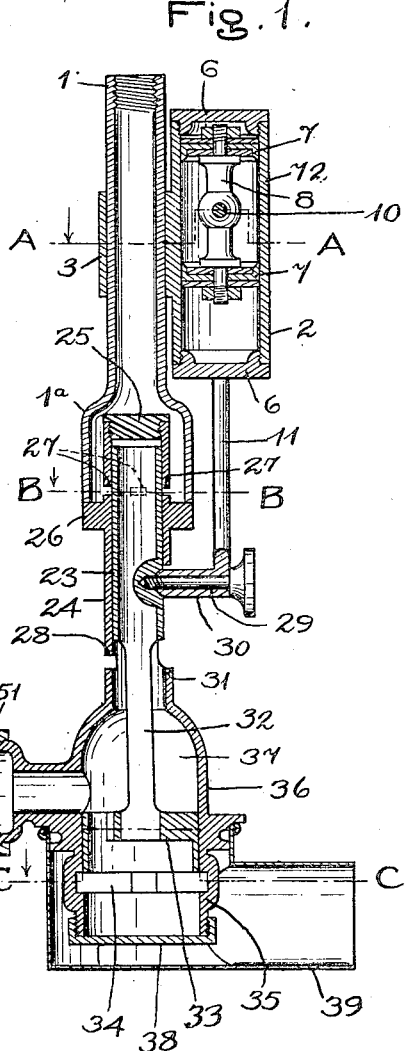
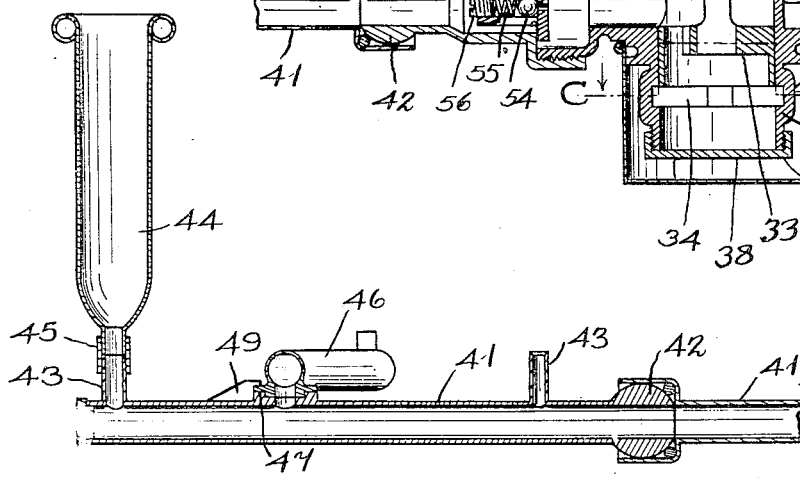
WITNESSES
Cornelius Zabriskie
Frances E N Blodgett
INVENTOR
Oscar Anderson,
BY Russell M. Everett,
ATTORNEY.

O. ANDERSON.
MILKING MACHINE.
APPLICATION FILED JUNE 21, 1911.
1,118,257.
Patented Nov. 24, 1914.
2 SHEETS—SHEET 2.
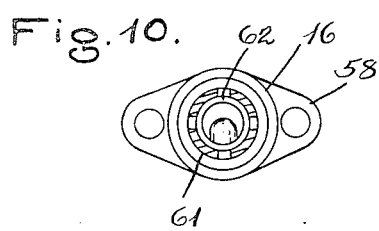
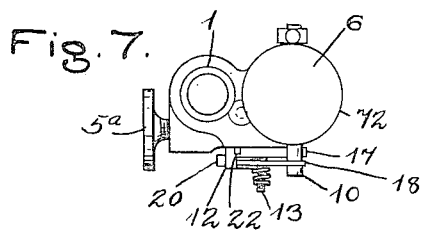
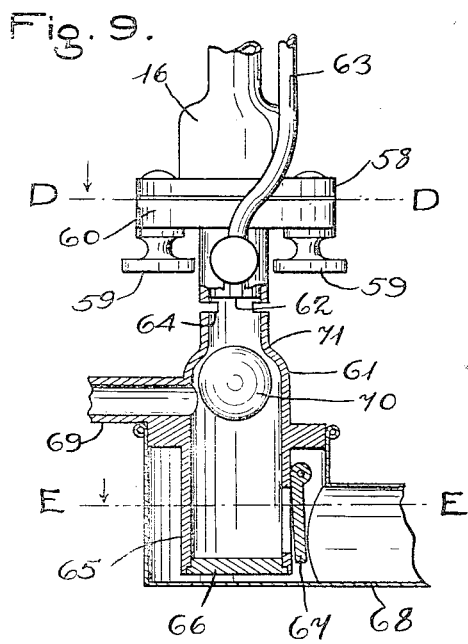
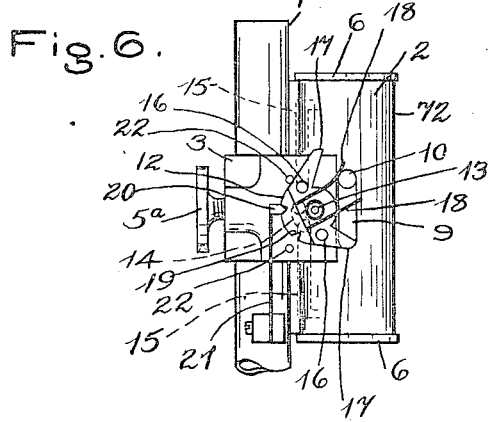
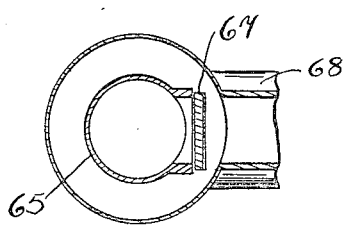
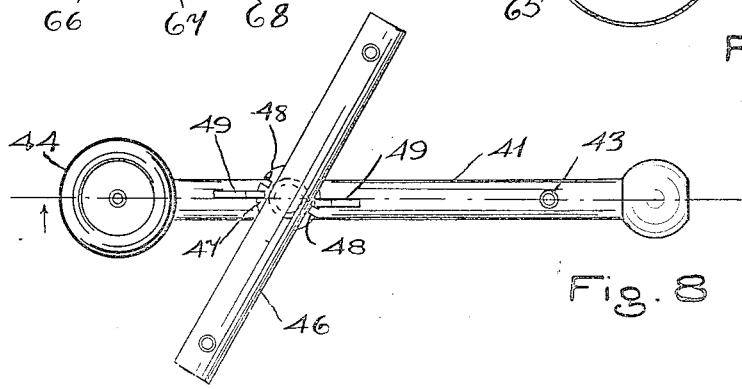
WITNESSES
Cornelius Zabriskie
Frances E. N. Blodgett.
INVENTOR
Oscar Anderson,
BY
Russell M. Everett,
ATTORNEY,
UNITED STATES PATENT OFFICE.

OSCAR ANDERSON, OF CHICAGO, ILLINOIS.

MILKING-MACHINE.

1,118,257.   Specification of Letters Patent.   Patented Nov. 24, 1914.

Application filed June 21, 1911. Serial No. 634,399.

*To all whom it may concern:*

Be it known that I, OSCAR ANDERSON, a citizen of the United States, residing at Chicago, in the county of Cook and State of Illinois, have invented certain Improvements in Milking-Machines, of which the following is a specification.

The present invention relates to certain new and useful improvements in milking machines of that general type in which pulsating suction is utilized for drawing the milk from the cow's teats, and the object of the invention is the provision of a milking machine of this character embodying novel features of construction whereby it is entirely automatic in its action and will deliver milk from the machine as it is drawn from the cow, and whereby it can be readily maintained in a clean and sanitary condition.

A further object of the invention is the provision of a milking machine which is comparatively simple and inexpensive in its construction, which comprises few and durable parts such as are not liable to get out of order, and which is positive and reliable in its action.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a vertical longitudinal sectional view through the motor and valve mechanism of a milking machine constructed in accordance with the invention. Fig. 2 is a sectional view through the milk conveyer and one of the teat cups. Fig. 3 is a transverse sectional view on the line A—A of Fig. 1. Fig. 4 is a similar view on the line B—B of Fig. 1. Fig. 5 is a similar view on the line C—C of Fig. 1. Fig. 6 is a side view of the motor. Fig. 7 is a top plan view of the motor. Fig. 8 is a top plan view of one of the teat cups and the milk conveying pipes for carrying the milk from the teat cups. Fig. 9 is a side elevation of a modified form of the milking apparatus, portions being shown in section. Fig. 10 is a transverse sectional view on the line D—D of Fig. 9, and Fig. 11 is a similar view on the line E—E of Fig. 9.

Corresponding and like parts are referred to in the following description and indicated in all the views of the drawings by the same reference characters.

Specifically describing the present embodiment of the invention, the numeral 1 designates a pipe which is designed to have the upper end thereof placed in communication with a suitable suction producing apparatus, the lower end of the pipe being enlarged at 1ª to receive the upper end of the pulsator valve. This pulsator valve is driven by a pneumatic motor 72 mounted upon the pipe 1 and actuated by the suction within the said pipe. In the present instance the cylinder 2 of the motor is formed with a sleeve 3 which extends around the suction pipe 1 and is rigid therewith, the said sleeve being provided with an opening 4 which leads from the exterior thereof to the interior of the suction pipe and is controlled by a valve 5. This valve 5 is formed with a handle 5ª and constitutes a means for starting and stopping the motor. The two ends of the cylinder 2 are closed by the removable heads 6, and a pair of spaced pistons 7 are mounted within the cylinder, the said pistons being connected by a rod 8 so as to move in unison. Longitudinal slots 9 are formed in opposite sides of the cylinder 2 at an intermediate point between the ends thereof, and these slots receive a cross bar 10 which is removably inserted through a transverse opening at the middle of the piston rod 8. One of the projecting ends of the cross bar 10 is connected to the pulsator valve by means of a pitman 11, while the opposite end of the cross bar serves to actuate the valve of the motor. This motor valve 12 is in the form of a plate which is pivoted at 13, one end of the valve plate being formed upon the inner face thereof with a depression 14 which is adapted to place the outer end of the opening 4 in communication with either one of a pair of passages 15 leading to opposite ends of the cylinder 2. It will also be observed that a pair of openings 16 are formed in the valve plate which are adapted to register alternately with the passages 15, so that when one of the passages is placed in communication with the interior of the suction pipe 1 through the medium of the depression 14, the opposite passage 14 is placed in communication with the outer atmosphere through one of the openings 16. The atmospheric pressure will thus act upon one of the pistons so as to move the pistons within the cylinder, and by automatically reversing the position of the valve at the end of each stroke, as will be more fully described, the pistons are caused to reciprocate back and forth in the usual manner. The valve plate 12 is formed with the rigid arms 17 which alternately project over opposite ends of the slot 9, and is also provided with a pair of spring arms 18 which a pair of depressions or notches 19 are upon opposite sides of the cross bar 10. Attention is further directed to the fact that a pair of depressions or notches 19 are formed in the valve plate 12, the said depressions being alternately engaged by a head 20 at the end of a spring strip 21 as the valve is oscillated back and forth between the limits of its movement. A pair of stop pins 22 are also shown as provided for the purpose of engaging the valve plate to limit the swinging movement thereof. With this construction, it will be obvious that as the pistons move from one end of the cylinder toward the opposite end, the cross bar 10 will first engage one of the spring arms 18 so as to flex the same, although the spring detent 20 which is in engagement with one of the notches 19 will prevent the valve from being moved by the said spring 18. However, when the pistons reach the limit of their movement, the cross bar 10 will engage one of the rigid arms 17 and act upon the same to forcibly move the valve a sufficient amount to release the detent 20 from engagement with the notch 19. The tension in the spring arm 18 which has been previously flexed will then cause a quick swinging movement of the valve plate to the opposite position and the valve will be held in this position by the engagement of the spring detent 20 with the opposite notch 19. The atmospheric pressure will then be caused to act upon the opposite piston and the two pistons will be moved toward the opposite end of the cylinder, the valve 12 being again reversed, as in the previous instance, when the pistons reach the limit of their movement. It will thus be obvious that the motor will operate continuously as long as the valve 5 is open, and that the apparatus can be stopped at any time by merely closing this valve.

The pulsator valve 23 has a tubular construction and slides within a tubular valve casing 24, the upper end of the said valve casing being closed by a removable plug 25 and being received within the flared lower end 1ª of the suction pipe 1. As shown upon the drawing, the flared lower end 1ª of the suction pipe abuts against a collar 26 upon the exterior of the valve casing 24, and any suitable means, such as that which will be described in connection with the modification shown in Fig. 9 may be employed for holding these members in a firm engagement with each other. A series of openings 27 are formed in the valve casing 24 at a point within the flared end of the suction pipe 1, and air inlet openings 28 are also provided in the lower end of the valve casing 24, the pulsator valve itself being detachably connected to the lower end of the pitman 11 by means of a screw 29 passing through a laterally projecting sleeve 30 formed in connection with the said pitman, a suitable slot 31 being provided in the valve casing 24 for the reception of the said sleeve. The pulsator valve 23 is connected by a suitable stem 32 to a milk valve 33 which is designed to control lateral milk outlet openings 34 in a neck 35 projecting downwardly from a casing 36 which is integral with the valve casing 24 of the pulsator valve and incloses the milk chamber 37. The lower end of the neck 35 is closed by a removable cap 38 and a discharge spout 39 is detachably applied to the neck so as to receive the milk from the outlet openings 34 and deliver it to an open receptacle of any suitable form. A lateral arm 40 projects from the casing 36 inclosing the milk chamber and has the end thereof connected to the conveyer tubes 41 which receive milk from the teats and deliver it to the milk chamber. Any suitable form of joint, such as the ball and socket joints 42 may be employed for connecting the various conveyer tubes 41 to each other and the end of the lateral arm 40. The end conveyer tube 41 is formed with suitable nipples 43 to which the teat cups 44 may be suitably connected in any manner such as by the rubber sleeves 45, and a cross arm 46 adapted to have teat cups applied to the ends thereof is detachably and pivotally mounted upon the conveyer tube. Any suitable construction may be provided for bringing about this result, the said cross arm being shown in the present instance as provided at the central portion thereof with a plate 47 surrounding the opening leading from the interior of the conveyer tube to the interior of the cross arm, and fitting against a flattened portion upon the conveyer tube, the periphery of the plate 47 being formed with notches 48 adapted to be turned into and out of registry with overhanging arms 49. The cross arm can thus be swung as may be necessary to adjust the teat cups to the cow, and is held securely against displacement as long as the notches 48 are not brought under the arms 49. However, when it is desired to detach the cross arm for cleaning the device, it is merely necessary to swing the cross arm into such a position that the arms 49 register with the notches 48 and then lift the cross bar away from the conveyer tube. Attention may also be directed to the fact that the extremity of the outer conveyer tube 41 is closed by a removable plug which can be taken out for the purpose of cleansing the interior of the conveyer tube.

The lateral arm 40 is shown as formed in two detachable sections, adjacent ends of the sections being flared outwardly and connected by a joint 51. A check valve 52 is provided at the junction of these two sections of the lateral arm 40, the said check valve opening toward the milk chamber so that suction will be produced within the teat cups at the same time the milk chamber is thrown into communication with the suction pipe 1. This valve 52 is formed with an opening 53 adapted to be closed by a secondary valve 54, the said valve being normally held upon its seat by means of a spring 55, and the tension in this spring being adjusted by means of a screw 56. As soon as the milk chamber is placed in communication with the outer atmosphere, the main valve 52 closes so as to maintain a partial vacuum within the teat cups, and the secondary valve 54 which opens inwardly toward the teat cups regulates the pressure of this partial vacuum. This partial vacuum is, of course, not as perfect a vacuum as is produced when the milk chamber is in communication with the suction pipe, but is sufficient to hold the teat cups in position, the exact pressure of the vacuum being determined by the tension under which the spring 55 is held by the screw 56. It will be understood, however, that should the teat cups be held in position by some positive means, such as a strap extending over the back of the cow, the valves 52 and 54 might be omitted, since the function of these valves is merely to maintain a sufficient vacuum within the teat cups to hold the said teat cups in position.

With the pulsator valve at the upper limit of its movement as indicated in Fig. 1, the suction openings 27 are closed and both the air inlet openings 29 and milk outlet openings 34 opened. Any milk which might previously have been drawn into the milk chamber 37 will thus flow through the milk outlets 34 and be discharged by the spout 39 into any suitable receptacle provided for the purpose of receiving the milk. Upon the downward movement of the pulsator valve, the milk valve 33 would first close the milk outlet openings 34, and the lower end of the pulsator valve 33 would next close the air inlet openings 28. A continued downward movement of the pulsator valve would then open the suction openings 27 so as to produce a partial vacuum in the milk chamber and also in the conveyer tubes and teat cups. This partial vacuum would tend to draw the milk from the cow and carry it to the milk chamber 37. As the pulsator valve 23 moved upwardly, the suction openings 27 would be first closed, the air inlet openings 27 then opened, and the milk outlet openings 34 then opened so as to permit a discharge of the milk from the milk chamber through the spout 39, as in the previous instance. It will thus be apparent that as the pulsator valve is moved back and forth through the medium of the motor, the milk chamber 37 will be alternately placed in communication with the suction pipe 1 and the milk outlet openings 34, the milk being discharged through the spout 39 as it is drawn from the cow without being brought into contact with the usual rubber tubes. Furthermore, if desired, a partial vacuum can always be maintained within the teat cups so as to hold the same in position and insure a proper working of the device.

A modification is shown in Figs. 9, 10 and 11 in which the suction pipe 16 is provided at its lower end with a flange 58 which is detachably secured by means of the thumb screws 59 to a similar flange 60 upon the casing 61 of the pulsator valve. The pulsator valve 62 is connected to the pitman 63 which may lead to the motor, and, as in the previous instance, places the casing 63 inclosing the milk chamber alternately in communication with the suction pipe and the opening 64 leading to the outer atmosphere. The neck 65 extending downward from the milk chamber has the lower end thereof closed by a removable plug 66 and is formed in one side thereof with a milk outlet opening adapted to be closed by an outwardly opening valve 67. This valve 67 is preferably a flap valve and is balanced so that it will normally assume a slightly open position. It will thus be seen that when the milk chamber is in communication with the suction pipe, the valve 67 will be closed by atmospheric pressure, while when the milk chamber is in communication with the outer atmosphere, any milk which may have accumulated within the milk chamber will be permitted to flow outwardly into the spout 68 which will convey it into a suitable receptacle. A lateral arm 69 through which the milk is conveyed from the teat cups to the milk chamber may be connected to the conveyer pipes in any suitable manner, such as that previously described, and a float valve 70 is arranged within the milk chamber so as to close the contracted upper end 71 of the milk chamber should the milk rise above a predetermined level, and prevent the milk from entering the pulsator valve and be drawn into the suction pipe. The operation of this modified form of the invention is similar to that previously described, pulsating suction being produced in the milk chamber and teat cups, and the milk being discharged from the machine as it is drawn from the cow.

A very valuable feature of the present construction resides in the fact that the various parts can be easily and quickly dismounted for the purpose of cleansing the same. The conveyer tubes 41 can be quickly detached and cleansed, and the discharge spout can also be readily removed. Furthermore, by removing the screw 29, and loosening the thumb screws 59, the pulsator valve can be detached from the suction tube and motor, and by removing the cap 38 from the lower end of the neck 35, both the pulsator valve and milk valve can be withdrawn. The two sections of the lateral arm 40 can also be detached to admit of the check valve contained therein being removed and thoroughly cleansed.

Having thus described the invention, what I claim is:—

1. In a milking machine, the combination of a suction pipe, a milk chamber connected to said suction pipe and having a milk inlet and a milk outlet, teat cups, and a connecting tube comprising rigid sections hingedly jointed together between said teat cups and milk chamber.

2. In a milking machine, the combination of a suction pipe, a milk chamber connected to said suction pipe and having a milk inlet and a milk outlet, a pulsator adjacent said milk chamber in fixed relation thereto, teat cups, and a connecting tube comprising rigid sections universally jointed together between said teat cups and milk chamber.

3. In a milking machine, a milk chamber having a valved milk inlet and a valved milk outlet, said outlet communicating with the atmosphere, teat cups connected to said milk inlet, a suction pipe, and a pulsator for alternately placing the said milk chamber in communication with the suction pipe and the atmosphere, said pulsator connected to the milk outlet valve to positively operate the same.

4. A milking machine including a main casing provided with a milk inlet and a milk outlet, a suction pipe, a pulsator for alternately placing the main casing in communication with the suction pipe and the outer atmosphere, and a milk valve operated by the pulsator and serving to close the milk outlet when the main casing is in communication with the suction pipe.

5. A milking machine including a main casing provided with a milk inlet and a milk outlet, a suction pipe, a pulsator for alternately placing the main casing in communication with the suction pipe and the outer atmosphere, and a milk valve rigidly connected to the pulsator and actuated thereby so as to close the milk outlet when the main casing is in communication with the suction pipe.

6. A milking machine including a main casing formed with a milk inlet and a milk outlet, a suction pipe, a tubular valve casing leading from the main casing to the suction pipe and provided with suction openings communicating with the suction pipe and air inlet openings communicating with the outer atmosphere, a pulsator valve slidably mounted within the tubular valve casing and formed with a stem projecting into the main casing, a milk valve carried by the stem for controlling the milk outlet, and means for actuating the pulsator valve, the said pulsator valve serving to alternately place the main casing in communication with the suction tube and the outer atmosphere and to close the milk outlet when the main casing is in communication with the suction tube.

7. A milking machine including a main casing provided with a milk inlet and also with a neck having a milk outlet therein, a suction pipe, a tubular valve casing arranged in alinement with the before mentioned neck and leading from the main casing to the suction pipe, the said valve casing being provided with a suction opening communicating with the suction pipe and also with an air inlet opening communicating with the outer atmosphere, a pulsator valve slidably mounted within the valve casing and provided with a stem projecting into the valve casing, a valve carried by the stem and operating in the neck of the main casing to control the milk outlet, and means for operating the pulsator valve, the said pulsator valve serving to place the main casing alternately in communication with the suction pipe and the outer atmosphere and to close the milk outlet when the main casing is in communication with the suction pipe.

8. In a milking machine, a milk chamber having a milk inlet and a milk outlet, a teat cup in communication with the milk inlet, means for intermittently producing suction in the milk chamber and at the same time closing the milk outlet, and valve means at said inlet for maintaining between the teat cup and milk chamber a predetermined degree of suction differing from that of the suction impulses during the intervals between said suction impulses in the milk chamber.

9. In a milking machine, a milk chamber having a milk inlet and milk outlet, a teat cup in communication with the milk inlet, means for intermittently producing suction in the milk chamber and at the same time closing the milk outlet, a check valve in the milk inlet closing toward the teat cup, and means for maintaining between the teat cup and milk chamber a predetermined difference of pressure during the intervals between the suction impulses.

10. A milking machine including a main casing provided with a milk inlet and a milk outlet, a teat cup in communication with the milk inlet, means for intermittently closing the milk outlet and producing a partial vacuum within the casing, means for maintaining a continuous partial vacuum in the teat cup, and means for regulating the pressure of this partial vacuum between the impulses received from the main casing.

11. A milking machine including a main casing formed with a milk inlet and a milk outlet, a teat cup in communication with the milk inlet, means for intermittently closing the milk outlet and producing a partial vacuum within the main casing, a check valve interposed between the teat cup and the milk inlet and opening toward the milk inlet so as to continuously maintain a partial vacuum within the teat cup, and a secondary valve carried by the check valve for regulating the pressure of this partial vacuum between the impulses received from the main casing.

12. A milking machine including a main casing provided with a milk inlet and a milk outlet, a teat cup in communication with the milk inlet, means for intermittently closing the milk outlet and producing a partial vacuum within the main casing, a check valve interposed between the teat cup and the inlet opening so as to maintain a continuous partial vacuum within the teat cup, a secondary valve carried by the check valve, a spring tending to hold the secondary valve upon its seat, and means for adjusting the tension in the spring, the said secondary valve opening toward the teat cup and serving to regulate the pressure of the partial vacuum in the teat cup between the impulses received from the main casing.

13. In a milking machine, the combination of a suction pipe, a milk chamber connected to said suction pipe and having a milk inlet and a milk outlet, teat cups, and a rigid member connecting said teat cups to said milk chamber in hinged relation thereto.

14. A milking machine including a main casing formed with a milk inlet and a neck having a milk outlet therein, means for intermittently closing the milk outlet and producing a partial vacuum within the main casing, and a discharge spout detachably applied to the neck for conveying milk from the outlet to an open receptacle.

15. A milking machine including a main casing formed with a milk inlet and a milk outlet, a tubular valve casing leading from the main casing, a suction pipe receiving the end of the valve casing, the said valve casing being formed with suction openings communicating with the suction pipe and also with inlet openings communicating with the outer atmosphere, means for detachably connecting the suction pipe and valve casing, a motor mounted upon the suction pipe, a pulsator valve mounted within the valve casing, and a detachable connection between the pulsator valve and the motor, the said pulsator valve serving to place the main casing alternately in communication with the suction pipe and outer atmosphere.

16. A milking machine including a main casing formed with a milk inlet and a milk outlet, a suction pipe, a tubular valve casing leading from the main casing and having the end thereof received within the suction pipe, the said valve casing being formed with a collar engaging the end of the suction pipe, means for holding the suction pipe detachably in engagement with the collar, a pulsator valve mounted within the valve casing, and means for actuating the pulsator valve for placing the main casing alternately in communication with the suction pipe and the outer atmosphere.

17. A milking machine including a main casing formed with a milk inlet and a neck having a lateral milk outlet therein, a tubular valve casing projecting from the main casing and arranged in alinement with the before mentioned neck, a removable cap closing the end of the neck, a suction pipe attached to the valve casing, a pulsator valve mounted within the valve casing for intermittently placing the main casing in communication with the suction pipe, a stem projecting from the pulsator valve, and a valve carried by the stem and operating within the neck to control the milk outlet, the two valves being removable through the neck when the cap is removed from the end thereof.

18. In a milking machine, the combination of a suction pipe, a milk chamber having a milk inlet and a milk outlet, a pulsator mounted on said milk chamber adapted to place the same in communication alternately with the suction pipe and the atmosphere, teat cups, and rigid members connecting said teat cups to said milk chamber in hinged relation thereto.

19. A motor for pulsator milking machines, including a cylinder, a piston mounted within the cylinder, a pipe, a valve for alternately placing opposite ends of the cylinder in communication with the pipe, means for locking the valve at either limit of its movement, a spring arm projecting from the valve, a rigid arm projecting from the valve, and means carried by the piston for first engaging the spring arm and flexing the same and then engaging the rigid arm to release the valve, the tension in the flexed spring arm serving to swing the valve into the opposite position as soon as released.

20. A motor for pulsator milking machines, including a cylinder, a piston mounted within the cylinder, a pipe, a valve for alternately placing opposite ends of the cylinder in communication with the pipe, a spring detent for locking the valve at either limit of its movement, a pair of rigid arms projecting from the valve, a pair of spring arms projecting from the valve between the rigid arms, and means carried by the piston for first engaging one of the spring arms so as to flex the same and then engaging one of the rigid arms to release the valve from the spring detent, the tension in the flexed spring arm then serving to swing the valve into its opposite position.

21. A motor for pulsator milking machines, including a cylinder having a slot in one side thereof, a piston mounted within the cylinder, a pipe, a valve for alternately placing opposite ends of the cylinder in communication with the pipe, a detent for locking the valve at either limit of its movement, a pair of rigid arms projecting from the valve, and a pair of spring arms projecting from the valve at an intermediate point between the rigid arms, the said spring arms extending across the slot in the cylinder and one of the rigid arms extending over one end of the slot according to the position of the valve, and a cross bar carried by the piston and projecting through the slot in the cylinder, the end of the cross bar being received between the spring arms and serving to engage one of the spring arms so as to flex the same when the piston is moved, the said cross bar engaging one of the rigid arms and releasing the valve from the spring detent when the piston reaches the limit of its movement, the tension in the spring which was flexed serving to swing the valve to the opposite position as soon as it is released.

OSCAR ANDERSON.

Witnesses:
MARY F. ALLEN,
GEO. T. MAY, Jr.